United States Patent
Lurie et al.

(10) Patent No.: US 9,792,326 B1
(45) Date of Patent: Oct. 17, 2017

(54) DYNAMICALLY SWITCHING BETWEEN EXECUTION PATHS FOR USER-DEFINED FUNCTIONS

(71) Applicant: INTERNATIONAL BUSINESS MACHINES CORPORATION, Armonk, NY (US)

(72) Inventors: Andrei F. Lurie, San Jose, CA (US); Dirk Nakott, Boeblingen (DE); Johannes Schuetzner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/338,665

(22) Filed: Oct. 31, 2016

(51) Int. Cl.
G06F 17/30 (2006.01)

(52) U.S. Cl.
CPC .. *G06F 17/30463* (2013.01); *G06F 17/30469* (2013.01)

(58) Field of Classification Search
CPC ............... G06F 17/30463; G06F 17/30469
USPC ........................................................ 707/718
See application file for complete search history.

(56) References Cited

U.S. PATENT DOCUMENTS

| | | | |
|---|---|---|---|
| 6,067,542 A * | 5/2000 | Carino, Jr. | G06F 17/30445 707/999.102 |
| 6,353,818 B1 * | 3/2002 | Carino, Jr. | G06F 17/30463 707/999.002 |
| 6,934,699 B1 * | 8/2005 | Haas | G06F 17/30457 707/999.002 |
| 7,155,432 B2 | 12/2006 | Eikenhorst et al. | |
| 7,890,480 B2 | 2/2011 | Barsness et al. | |
| 8,447,743 B2 | 5/2013 | Santosuosso | |
| 8,682,875 B2 | 3/2014 | Barsness et al. | |
| 9,020,929 B2 | 4/2015 | Santosuosso | |
| 2006/0026116 A1 * | 2/2006 | Day | G06F 17/30471 707/999.001 |
| 2008/0071785 A1 * | 3/2008 | Kabra | G06F 17/30306 707/999.009 |
| 2008/0195577 A1 * | 8/2008 | Fan | G06F 17/30469 707/999.002 |
| 2008/0301135 A1 * | 12/2008 | Alves | G06F 17/30442 707/999.006 |
| 2009/0030874 A1 * | 1/2009 | Das | G06F 17/30312 707/999.002 |
| 2010/0036804 A1 | 2/2010 | Blamer et al. | |
| 2012/0130963 A1 | 5/2012 | Luo et al. | |

(Continued)

OTHER PUBLICATIONS

Simhadr,I, Varun et al., "Decorrelation of User Defined Function Invocations in Queries," ICDE Conference, Jan. 2014, pp. 532-543.

(Continued)

*Primary Examiner* — Kris Mackes
*Assistant Examiner* — Tiffany Bui
(74) *Attorney, Agent, or Firm* — Heslin Rothenberg Farley & Mesiti P.C.

(57) ABSTRACT

Dynamically switching between a plurality of execution paths to execute a function, such as a user-defined function. The plurality of execution paths include an execution path that uses caching and another execution path that uses inlining. A user-defined function is executed at least once using a first execution path. Then, for a later execution of the function, the execution path is automatically switched to a second execution path.

13 Claims, 12 Drawing Sheets

(56) References Cited

U.S. PATENT DOCUMENTS

2014/0095470 A1* 4/2014 Chen .................. G06F 17/30466
707/714
2014/0101133 A1* 4/2014 Carston ............. G06F 17/30469
707/718
2014/0108378 A1* 4/2014 Alpers .............. G06F 17/30469
707/716
2016/0342654 A1* 11/2016 Bendel .............. G06F 17/30463

OTHER PUBLICATIONS

IBM, "z/Architecture—Principles of Operation," SA22-7832-10, Eleventh Edition, Mar. 2015, pp. 1-1732.

* cited by examiner

DYNAMICALLY SWITCHING BETWEEN EXECUTION PATHS FOR USER-DEFINED FUNCTIONS

BACKGROUND

One or more aspects relate, in general, to processing within a computing environment, and in particular, to processing associated with database systems of a computing environment.

Database systems allow the creation of user-defined functions (UDFs) that encapsulate application logic and can be invoked from SQL (Structured Query Language) statements. UDFs can be developed in a general purpose programming language, like C or Java, or they can be coded natively in SQL Procedural Language (SQL PL). Each invocation of a UDF results in a call overhead due to context switching.

There are scalar UDFs, which return a single value, and table UDFs, which return a result set. UDFs may or may not issue SQL statements themselves to compute the result. Application developers choose UDFs to push down application logic to the database tier, which can speed up performance and encapsulate common logic. It also enables the aggregation of data records directly in the database, if the data exists in different units and requires some kind of normalization first, e.g. same physical unit, same financial currency, same date intervals, etc.

Database systems today are capable of statically optimizing the execution of queries containing UDFs by inlining them or by caching result sets. However, this is a static decision that is set when a query referencing the UDF is prepared by the optimizer, and hence, only optimizes the processing for certain sets of workloads, which does not help other workloads.

SUMMARY

Shortcomings of the prior art are overcome and additional advantages are provided through the provision of a computer program product for facilitating processing in a computing environment. The computer program product comprises a computer readable storage medium readable by a processing circuit and storing instructions for execution by the processing circuit for performing a method. The method includes, for instance, executing a function using a first execution path; obtaining the function to be executed a next time; determining, based on obtaining the function, whether the first execution path is to be used to execute the function the next time; automatically switching to a second execution path, based on determining the first execution path is not to be used; and executing the function using the second execution path, based on automatically switching to the second execution path, wherein the first execution path and the second execution path are determined at preparation time of code that includes the function.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
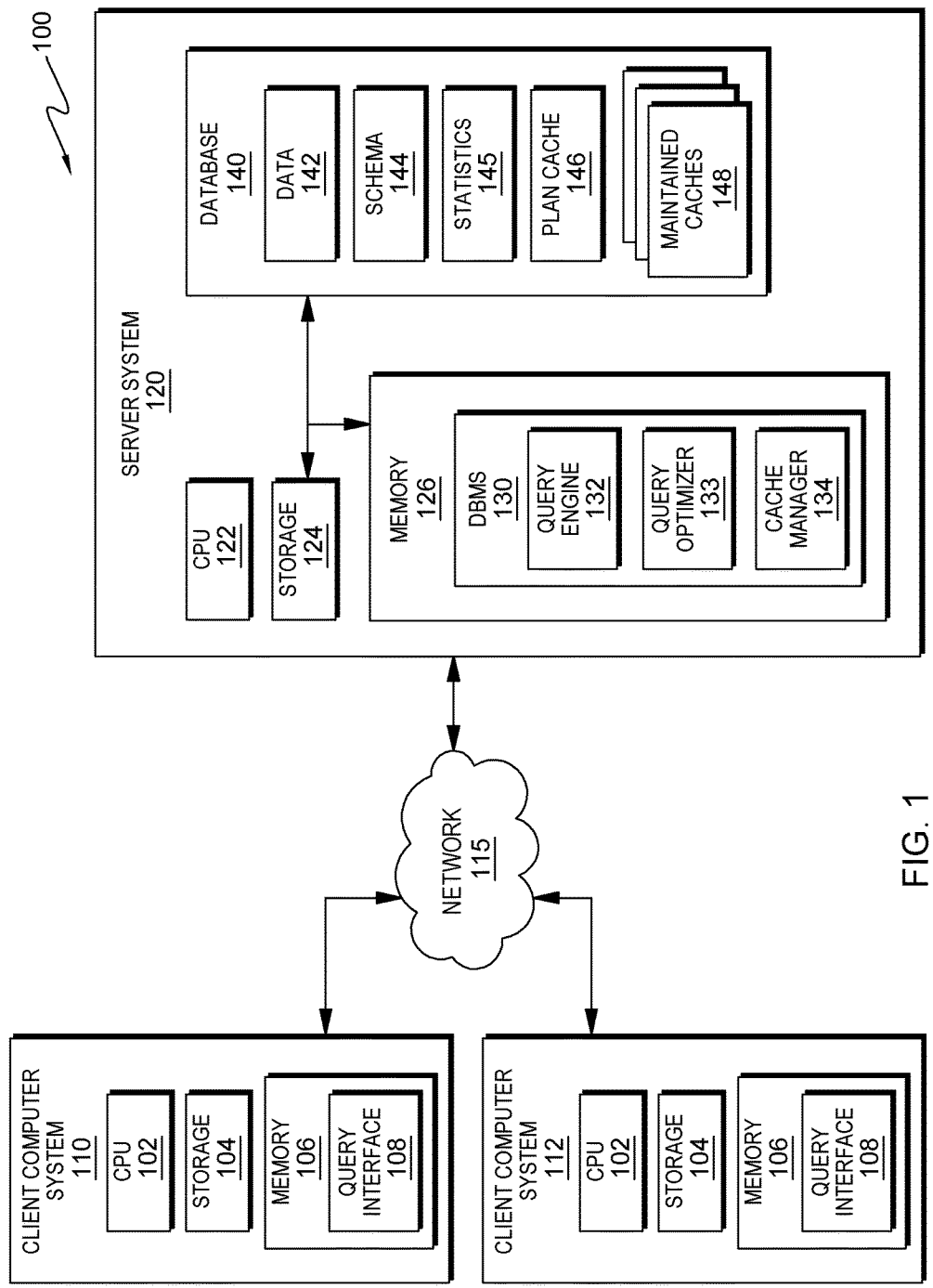
FIG. 1 depicts one example of a computing environment to incorporate and use one or more aspects of the present invention.

In accordance with an aspect of the present invention, a capability is provided to dynamically switch between a plurality of execution paths (also may be referred to as access paths, options, plans, or flows) to execute functions, such as user-defined functions (UDFs). As examples, one execution path uses inlining, in which the UDF is placed within the code (e.g., within an SQL statement) such that there is no context switching, and another execution path uses caching in which a computed value or result set of a UDF is cached. In one embodiment, the effectiveness of one path (e.g., caching) is determined, and if deemed ineffective (e.g., below a certain limit), then another path is automatically selected (e.g., inlining). Other examples exist.

As described herein, application developers choose UDFs to push down application logic to the database tier, which can speed up performance and encapsulate common logic. UDFs are called deterministic if they produce the same result based on the same values for the input parameters. UDFs can also be deterministic within an SQL statement or within a commit scope (DETERMINISTIC [UNLIMITED (default) COMMIT STATEMENT]).

Scalar functions are invoked from SQL statements and may be executed very often depending on the size of the tables searched by the statements and the number of qualifying rows of the tables being accessed. The following is an example SQL statement that uses a scalar UDF, referred to as FISCAL_YEAR. The SQL SELECT statement invokes this UDF for every row from table deal_postings with a value ASIA for the attribute region. This can mean the UDF is invoked millions of times depending on the size of the table and selectivity of the attribute. Further, each invocation of the UDF results in a call overhead due to context switching.

The example includes:

SELECT product_category, sum (deal_size)
FROM deal_postings
WHERE region='ASIA'
  and FISCAL_YEAR (selling_date)=2014
GROUP BY product_category
CREATE FUNCTION FISCAL_YEAR (cal_date VAR-GRAPHIC(8))
RETURNS INTEGER
LANGUAGE SQL
DETERMINISTIC
NO EXTERNAL ACTION
READS SQL DATA
BEGIN
  DECLARE MONTH, YEAR INTEGER;
  SET YEAR=SUBSTR (cal_date, 1, 4);
  SET MONTH=SUBSTR (cal_date, 5, 2);
  IF MONTH>9 THEN
    RETURN YEAR+1;
  ELSE
    RETURN YEAR;
  END IF;
END To prevent UDFs from becoming a performance bottleneck, some database systems provide a cache for UDFs (referred to as caching), so that a UDF does not need to be re-executed if it was executed previously with the same input parameters. Instead, the database system retrieves the previously computed value from the cache that is associated with the specific UDF. On the other hand, if a UDF is executed repeatedly with different input parameters, the cache does not help, and rather incurs an overhead to manage the cache. In this case, it is beneficial to inline the UDF into the SQL statement text (referred to as inlining), so that it is executed directly as part of the SQL statement. This avoids the call overhead to invoke the UDF, but it does not take advantage of the cache. The logic is executed for every row.

Today, database designers and performance engineers manually opt for one or the other execution path (caching or inlining), and hence, only optimize one case. This forces the optimization decision to be performed prior to processing the actual workload and creates the possibility of an incorrect choice (e.g., selecting caching when, in reality, the UDF is invoked with a lot of unique input values), thus leading to sub-optimal performance for dynamic workloads.

In one example, before an SQL statement is executed, the database system is to determine its execution path, i.e., it performs an SQL PREPARE. For UDFs that are written in SQL PL, their source code is usually stored in the database catalog. When the database system executes the PREPARE for an SQL statement containing an SQL PL UDF, in accordance with an aspect of the present invention, a hybrid optimization is employed that automatically combines the inlining capability, where possible, and the result set cache optimization for database UDFs. It results in a hybrid SQL execution path of the UDF where different execution paths are supported autonomically and without a need for any external changes, like rebind or re-generation, of internal control structures, such as the executable query execution path.

For instance, in one aspect, during SQL PREPARE, the database engine retrieves the UDF definition from the catalog and inlines it into the SQL statement as an optional execution block. When the SQL statement is executed, its UDFs are first executed outside of the statement as is common today. The database engine maintains and exploits a UDF result set cache, which is based on the deterministic scope definition of the UDF, and it does not (yet) use the optional execution block. This behavior optimizes the performance of UDFs with relatively few unique input parameters in relation to the total number of invocations of the UDF.

During statement execution, in accordance with an aspect of the present invention, the database engine monitors the effectiveness of the result set cache. If, for instance, it falls below a certain limit, the statement stops using the cache and rather starts using the inlined execution blocks of the UDF. While there is no UDF cache benefit in using the inlined execution blocks, there is also no call overhead for the UDFs. Since the different execution blocks (e.g., cache and inline) may be switched multiple times during multiple executions of an SQL statement, the switching is to be accomplished in a highly efficient manner. Further, in other embodiments, other paths, options, plans or flows may be added to such a hybrid setup, and the most effective is automatically selected.

FIG. 1 depicts one example of a computing environment 100 to incorporate and use one or more aspects of the present invention. In one example, computing environment 100 is a client/server environment. However, in other embodiments, computing environments other than client/server environments may incorporate and include aspects of the present invention. Further, in one embodiment, one or more processors of computing environment 100 are based on the z/Architecture offered by International Business Machines (IBM®) Corporation, Armonk, N.Y. The z/Architecture is described in an IBM Publication entitled "z/Architecture—Principles of Operation," Publication No. SA22-7832-10, 11$^{th}$ Edition, March 2015, which is hereby incorporated by reference herein in its entirety. Z/ARCHITECTURE and IBM (referenced herein) are registered trademarks of International Business Machines Corporation, Armonk, N.Y. Other names used herein may be registered trademarks, trademarks or product names of International Business Machines Corporation or other companies.

In one example, computing environment 100 includes two client computer systems 110 and 112, network 115 and server system 120. In one embodiment, the computer systems illustrated in environment 100 may include existing computer systems, e.g., desktop computers, server computers, laptop computers, table computers, and the like. A computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Many examples are possible.

Client computer systems 110 and 112 each include a processor (e.g., central processing unit (CPU)) 102, storage 104 and memory 106, typically connected by a bus (not shown). CPU 102 is a programmable logic device that performs the instructions, logic, and mathematical processing in a computer. Storage 104 stores, e.g., application programs and data for use by client computer systems 110 and 112. Storage 104 includes hard-disk drives, flash memory devices, optical media and the like, as examples. Memory 106 is, e.g., main memory, also referred to as main storage or central storage. Memory 106 includes, in one example, a query interface (also referred to as a query tool) 108. In one embodiment, query interface 108 is a software application that allows end users to access information stored in a database (e.g., database 140). Accordingly, query interface 108 may allow users to compose and submit a query to a database system, which, in response, may be configured to process the query and return a set of query results. Query interface 108 may be configured to compose queries in a database query language, such as the Structured Query Language (SQL). However, it should be noted that query interface 108 is only one example; any suitable requesting entity may submit a query (e.g., another application, an operating system, etc.)

Client computer systems 110, 112 are coupled to server system 120 via a network 115. Network 115 generally represents any kind of data communications network. Accordingly, network 115 may represent both local and wide area networks, including the Internet.

In one embodiment, server system 120 includes a processor (e.g., CPU) 122, storage 124, memory 126, and a database 140. Memory 126 (e.g., random access memory) may include a database management system (DBMS) 130. DBMS 130 provides a software application used to organize, analyze, and modify information stored in database 140. DBMS 130 includes, for instance, a query engine 132, a query optimizer 133, and a cache manager 134. Query engine 132 may be configured to process database queries submitted by a requesting application (e.g., a query generated using query interface 108) and to return a set of query results to the requesting application. Query optimizer 133 and cache manager 134 are further described below.

Database 140 includes, for instance, data 142, schema 144, statistics 145, plan cache 146 and maintained caches 148. In other embodiments, database 140 may include more, fewer and/or different components than described in this example.

Data 142 represents the substantive data stored by database 140. Schema 144 represents the structure of the elements of database 140 (i.e., tables, fields, keys, views, indexes, etc.); and statistics 145 may include metadata describing characteristics of the database 140 (e.g., frequent values list (FVL) statistics, cardinality statistics, histogram statistics, performance statistics, etc.).

Further, plan cache 146 may be, for instance, a data structure storing query plans generated by query optimizer 133, as well as auxiliary data (e.g., temporary indexes, tables, etc.) used in generating query plans. The query plans are for optimizing subsequent queries, thus reducing the amount of processing required by cache manager 134. Further, plan cache 146 may include historical data of past uses of database 140 (e.g., the number of times each query has been run, the most commonly-used tables and indexes, etc.).

Moreover, in one embodiment, maintained caches 148 may represent multiple input/output (I/O) value cache objects, each including matched sets of input and output values for a given query. That is, each maintained cache 148 may include values that are used as query inputs (i.e., predicates), as well as corresponding output values from executing the query.

In one embodiment, cache manager 134 may be configured to improve execution of queries using maintained caches 148. For instance, cache manager 134 may use maintained caches 148 to determine query results without having to execute the query, thus reducing the time and resources required to execute the query. Each one of maintained caches 148 may be configured for use by a particular query.

Figure 2:
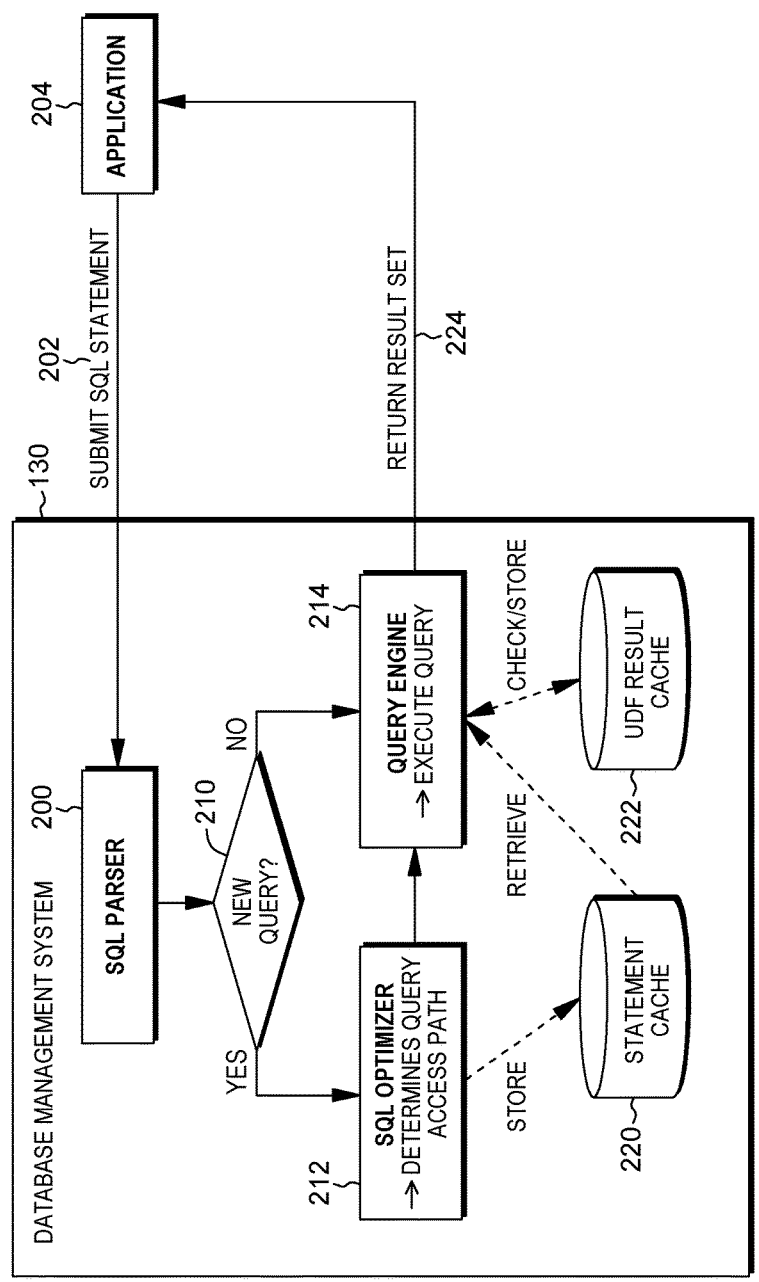
FIG. 2 depicts one example of a database management system.

Further details relating to one embodiment of database management system 130 are described with reference to FIG. 2. In this embodiment, database management system 130 includes an SQL parser 200, which analyzes the structure of an SQL statement 202 submitted by an application 204. Parser 200 determines whether the received statement is a new query, INQUIRY 210. If it is a new query, then parser 202 invokes an SQL optimizer 212 (e.g., an embodiment of query optimizer 133), which determines a new query execution path for the query (e.g., caching or inlining). Optimizer 212 stores the execution path in an SQL statement cache 220 (e.g., an example of plan cache 146).

Returning to INQUIRY 210, if the received query is not a new query, then a query engine 214 (e.g., an embodiment of query engine 132) executes the query. For instance, it retrieves the stored query execution path from statement cache 220, and executes the query. If the query contains one or more UDFs, and the stored execution path is caching, then the query engine stores the result of UDF executions in UDF result cache 222 (e.g., one embodiment of a maintained cache 148). A result set 224 is also returned to requesting application 204.

Figure 3:
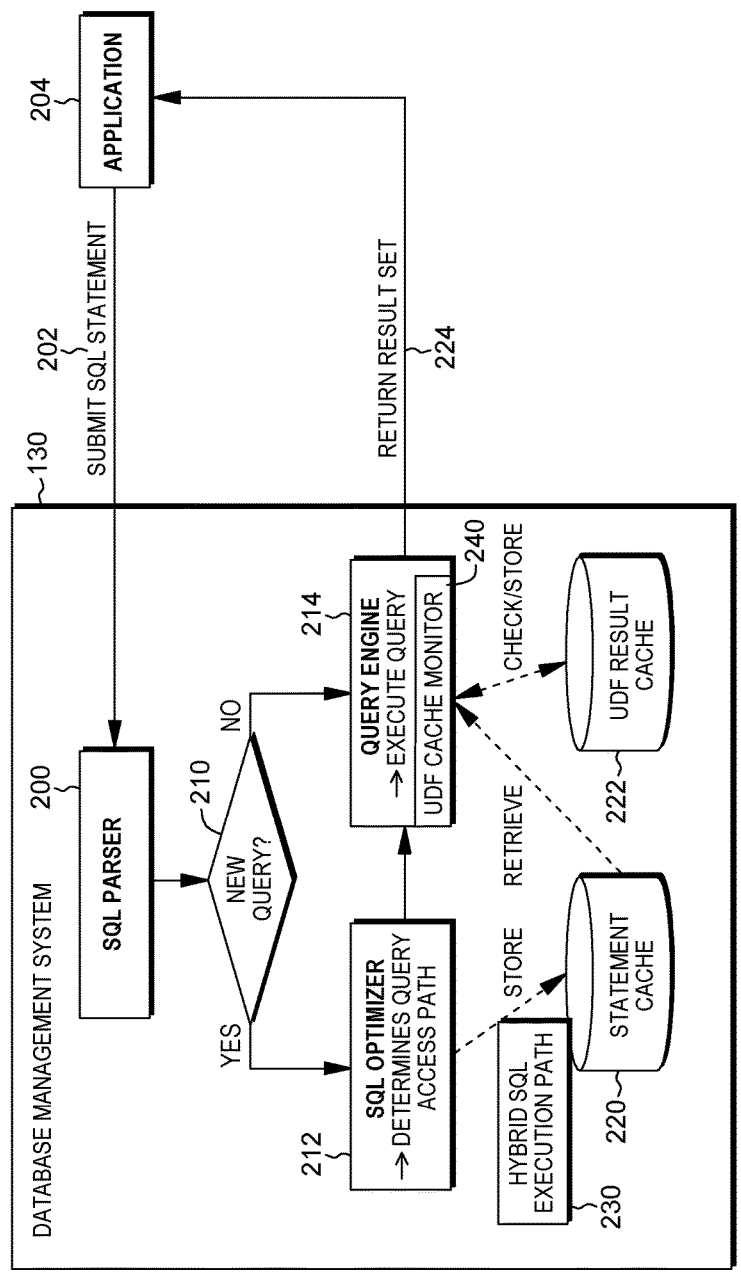
FIG. 3 depicts another example of a database management system, in accordance with an aspect of the present invention.

In accordance with an aspect of the present invention, database management system 130 provides a hybrid execution path, which may include execution blocks for a plurality of execution paths. For example, as shown in FIG. 3, a hybrid SQL execution path 230 is provided that includes execution blocks for inlined UDF execution (inlining) and for cached UDF result execution (caching). Both of these execution blocks are included in statement cache 220 and are part of the available execution paths to execute a UDF. SQL query engine 214 ensures that only one of the available execution paths is executed for a given UDF invocation. Having execution blocks for different paths later enables the query engine to execute any one of them depending on which optimization is currently chosen. To reduce memory consumption, in one embodiment, the query engine only loads those execution blocks into memory that are currently executed.

Query engine 214 executes the query using a stored execution path from the statement cache. Assuming the query includes one or more UDFs, for each UDF, an execution path is selected from a plurality of execution paths. In one example, for at least the first execution of each UDF, the caching execution path is selected. The UDF is executed and query engine 214 stores the result of UDF execution in UDF result cache 222. In accordance with an aspect of the invention, a UDF cache monitor 240 (which may be a part of cache manager 134, query engine 214 or a separate component) turns on and turns off the UDF result cache, as appropriate and changes the hybrid SQL execution path, accordingly. Since, initially, the selected execution path is caching, the use of UDF result cache 222 is turned on. However, in later executions, if inlining is the selected execution path for a UDF, then the use of UDF result cache 222 is turned off. The query engine also returns the result set of the query to the application. Since UDF result cache 222 can be accessed with high frequency, it is implemented to enable very fast access of the matching cache entries. This is enabled by organizing the cache entries in, e.g., a hash table with the input parameters of the UDF as a hash key.

Figure 4:
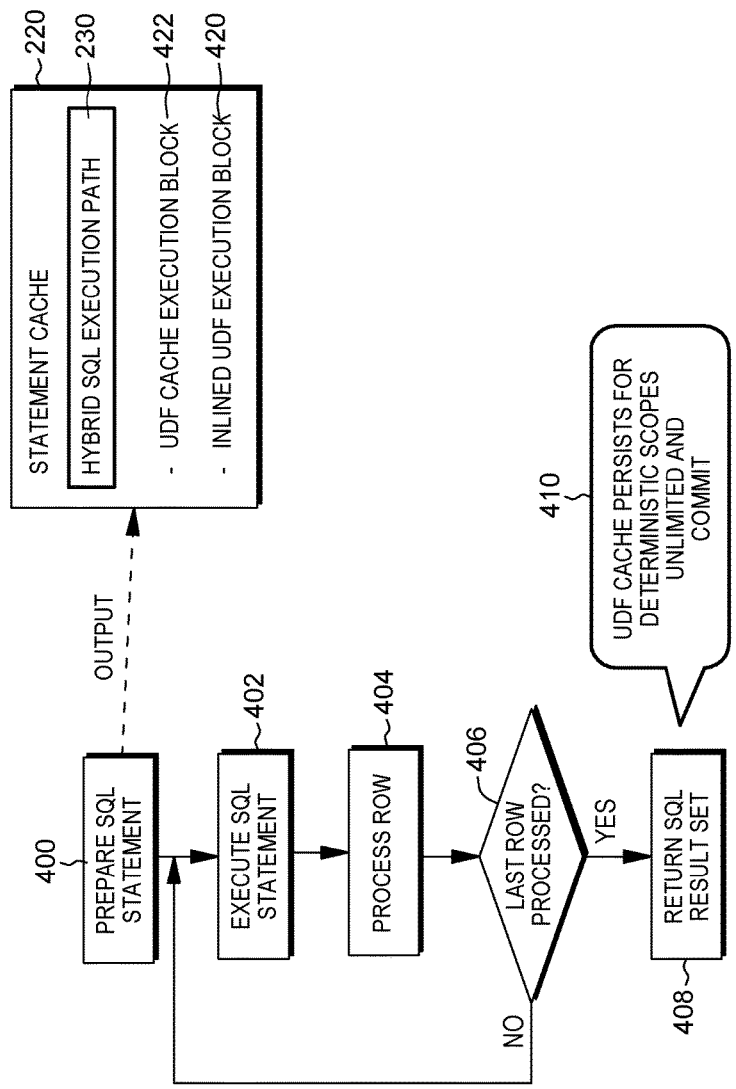
FIG. 4 depicts one example of a workflow relating to one or more aspects of the present invention.

One example of a workflow relating to one or more aspects of the present invention is described with reference to FIG. 4. Initially, an SQL statement is prepared, STEP 400, which means that an SQL execution path is determined and stored in statement cache 220. If the SQL statement includes a UDF, then in accordance with an aspect of the present invention, a hybrid SQL execution path 230 may be provided that contains an inlined UDF execution block 420 (for an inlining execution path) and a cached UDF execution block 422 (for a caching execution path). The hybrid SQL execution path encapsulates these two execution blocks (and/or others) such that they can be later dynamically exchanged while the query is executed allowing either a first execution path (e.g., caching) or a second execution path (e.g., inlining), and/or others, to be used for the UDF included in the SQL statement. This encapsulation is accomplished by using a well-defined application programming interface to pass parameters, such as input variables or the results, to and from these execution blocks.

The SQL statement is then executed, STEP 402, which includes processing a row, STEP 404, that is qualified according to the predicates of the SQL statement. If a UDF is defined, the UDF is executed with the values of this row as potential input parameters and using one of the execution paths. Further details of processing a row are described below.

Further, if there are more qualifying rows, INQUIRY 406, then the next row is processed. Thus, the flow returns to STEP 402 to re-execute the SQL statement and invoke a UDF, if one is included. This continues until there are no more qualifying rows. A result set is returned to the application, STEP 408. If the UDFs of the statement were defined with deterministic scope UNLIMITED or COMMIT, then their associated caches are kept (e.g., if caching, the cache is kept, and if inlining, the previously created cache is kept), STEP 410. Otherwise, they are dropped.

Figure 5:
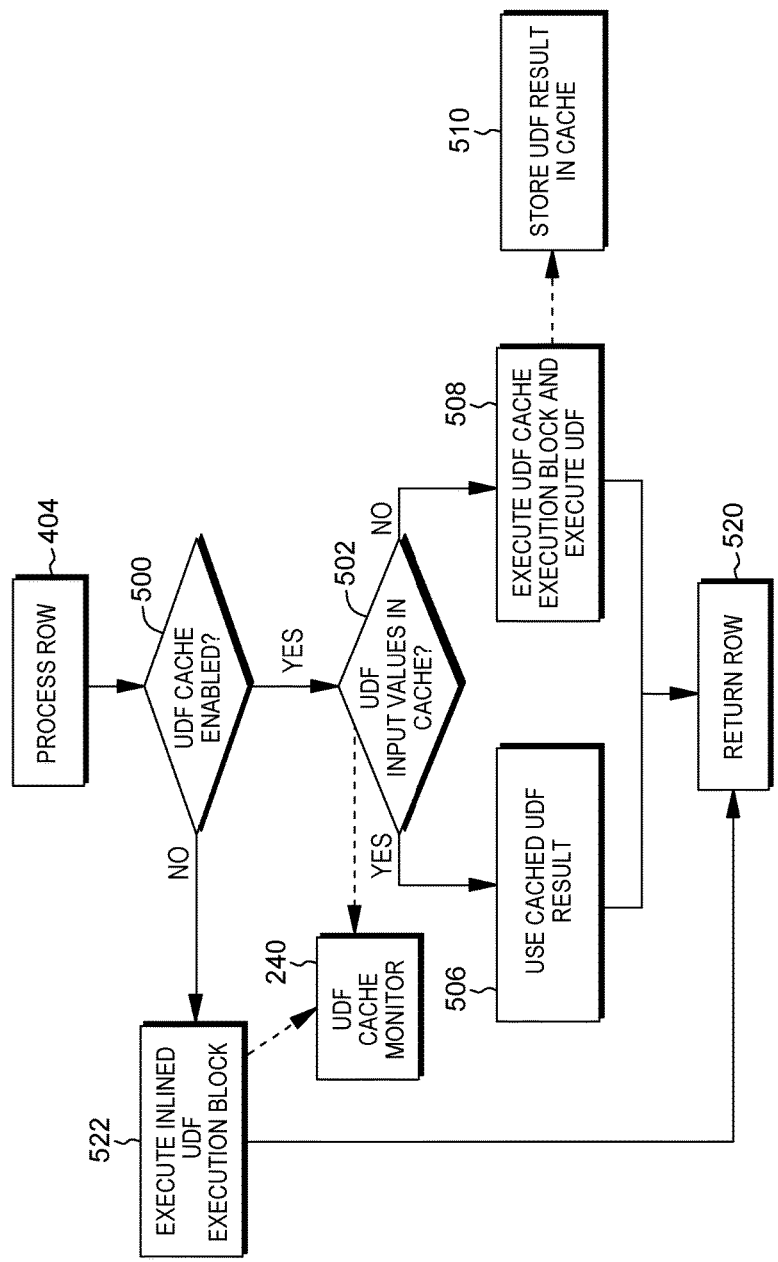
FIG. 5 depicts further details relating to processing a row of the workflow of FIG. 4, in accordance with an aspect of the present invention.

Further details associated with processing a row are described with reference to FIG. 5. In one embodiment, to process a row, STEP 404, query engine 214 checks whether UDF cache 222 is enabled, INQUIRY 500. If it is enabled, query engine 214 calls UDF cache monitor, described below, and checks whether the UDF input values are in the cache of this UDF, INQUIRY 502. If the input values are in the cache, query engine 214 increases the counter for the number of invocations of this UDF (count_rows) and the counter for cache hits (count_cache_hits) for this UDF. To avoid a performance penalty, these counters are maintained in memory. Then, query engine 214 retrieves the UDF result from the cache (e.g., optionally using cache manager 134), STEP 506, and returns the result value with other values of the row, STEP 520.

Returning to INQUIRY 502, if the UDF input values are not in the cache, query engine 214 increases the count_rows counter of this UDF, activates and processes the UDF cache execution block and executes the UDF using the caching execution path, STEP 508. It stores the UDF result in its associated cache, STEP 510, and returns the result value with the other values of the row, STEP 520.

In one embodiment, to prevent large UDF caches from monopolizing memory, the UDF cache size is restricted to a certain size.

Returning to INQUIRY 500, if the check whether the UDF cache is enabled returns a no, then query engine 214 calls UDF cache monitor 240, and activates and executes the inlined UDF execution block to execute the UDF using the inlining execution path, STEP 522. It then returns the row, STEP 520.

As shown, each invocation of the UDF in processing a row may select between a plurality of execution paths, such as caching, inlining or others.

Figure 6:
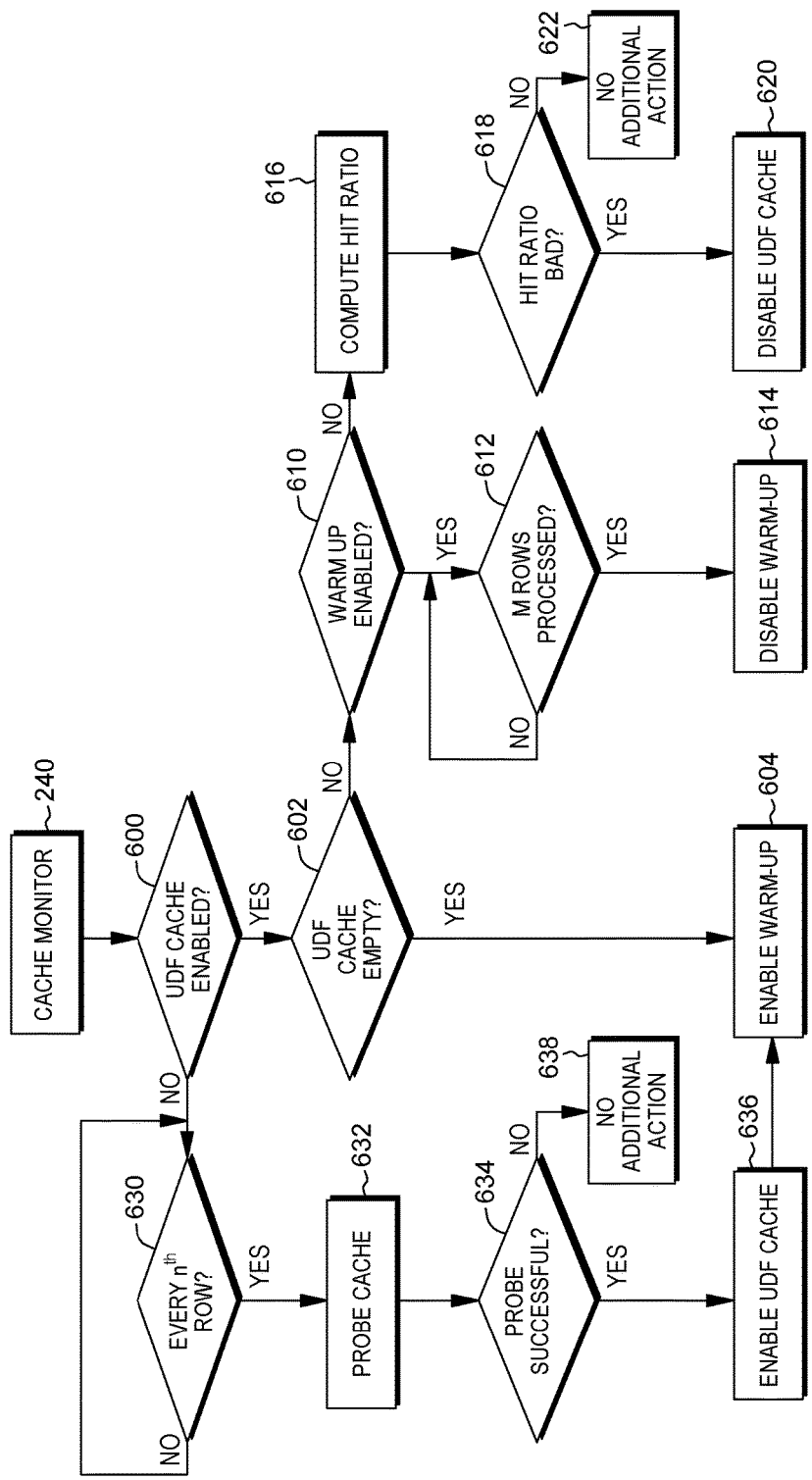
FIG. 6 depicts one example of logic associated with using a cache monitor, in accordance with an aspect of the present invention.

Further details regarding processing associated with UDF cache monitor 240 are described with reference to FIG. 6. In general, UDF cache monitor 240 enables or disables the usage of the UDF cache. If the UDF cache is empty, or the UDF cache usage is changed from disabled to enabled, a UDF cache warm-up phase occurs, in one example.

In one embodiment, for each invocation of a UDF, UDF cache monitor 240 checks whether the UDF cache is enabled, INQUIRY 600. By default, the cache is enabled, and therefore, cache monitor 240 checks if the UDF cache is empty, INQUIRY 602. The cache is empty at first use. In this case, a UDF cache warm-up phase is enabled, STEP 604, and the UDF cache remains active. Returning to INQUIRY 602, if the UDF cache is not empty, a check is made as to whether the warm-up phase is enabled, INQUIRY 610. If the warm-up phase is enabled, a determination is made as to whether m rows have been processed, INQUIRY 612. If m rows have not been processed, then rows continue to be processed. However, when m rows have been processed, the warm-up phase is disabled (finished), STEP 614. If the warm-up phase is finished (or disabled), INQUIRY 610, the UDF cache hit ratio is computed, STEP 616. The hit ratio is computed by count_rows divided by count_cache_hits. A check is made of the effectiveness of the cache, e.g., whether the hit ratio of STEP 616 is unsatisfactory, INQUIRY 618. It is unsatisfactory if the ratio is below a certain threshold (y %), such as, e.g., 10%. In this case, the UDF cache is not efficient and is disabled, STEP 620. The UDF cache entries are kept though so that they can potentially be reused later. An individual UDF cache ratio can be defined for each UDF by specifying UDF CACHE RATIO y %. However, if the effectiveness of the cache is satisfactory, INQUIRY 618, then no additional action is taken by the cache monitor, STEP 622.

Returning to INQUIRY 600, if the UDF cache is disabled, a determination is made as to whether it is the nth row being processed, INQUIRY 630. If it is not the nth row, rows continue to be processed without probing the cache. However, if it is the nth row, the cache is probed, STEP 632. That is, a check is made to determine whether the values for the input parameters of the current invocation of the UDF are in the cache. If the cache probe succeeds, INQUIRY 634, cache monitor 240 enables the UDF cache, STEP 636, and enables a warm-up phase again, STEP 604. At the beginning of the warm-up phase, count_rows and count_cache_hits are set to zero. However, returning to INQUIRY 634, if the cache probe is unsuccessful, no additional action is taken by the cache monitor, STEP 638.

As described herein, an execution path for a given function, e.g., UDF, may be automatically switched between a plurality of execution paths based on performance of particular paths. In accordance with one or more aspects, the execution paths (e.g., execution blocks) are switched very efficiently by taking advantage of the following optimizations:

No need to re-prepare the SQL statement during execution because the initial PREPARE created execution blocks for the potential flows.

Proper encapsulation of the execution blocks so that the blocks can be efficiently replaced in the SQL execution path during execution. For instance, the query engine is prepared to switch back and forth; i.e., to use any of the provided execution blocks.

Warm-up phase of the UDF cache to avoid pre-mature switching to inlining.

When the SQL execution path switches to inlining, the UDF cache is kept to allow later probing and switching back to the UDF cache execution block.

A UDF cache monitor maintains low-overhead counters and thresholds on the effectiveness of the cache.

Active management of the size of the UDF cache to avoid reverse performance effect by paging. If a UDF cache has not been used for a certain timespan, it is emptied.

Unlike database systems today that are capable of statically optimizing the execution of queries containing UDFs by inlining them or by caching result sets, a dynamic approach is provided. Unlike a static decision that is set when a query referencing the UDF is prepared by the optimizer and hence only optimizes the processing for certain sets of workloads, which does not help other workloads, the dynamic approach allows selection of the execution path during execution of the query and optimizes processing for multiple sets of workloads.

As described herein, a capability for dynamically switching between execution paths (e.g., based on performance monitoring) for different executions of a function is provided. In one embodiment, when a database system executes the PREPARE for an SQL statement containing a SQL PL UDF, it creates an SQL execution path that exploits a UDF cache. The effectiveness of the UDF cache is monitored by a UDF cache monitor during execution of the SQL statement and automatically disables the cache, if it is assessed to be ineffective. This approach is extended so that the prepared SQL access path takes both UDF caching and inlining into account. In autonomic fashion, the query execution uses the result set cache optimization for database UDFs, as long as it is beneficial, and switches to UDF inlining if no longer optimal. When the switch to inlining occurs, the UDF cache is kept. This results in a hybrid SQL execution path of the UDF where different flows are supported autonomically and without a need for any external changes, like rebind or re-generation, of internal control structures. Further, this approach is extended to switching back from inlining to caching by probing input values of new UDF calls against the saved cache every n invocations. Additionally, other flows can be readily added to such a hybrid setup, and the most effective flow will be automatically selected. Many variations are possible.

Further details of one embodiment of facilitating processing within a computing environment by enabling automatic switching between execution paths are described with reference to FIGS. 7A-7B. Aspects of the invention are inextricably tied to computer technology and facilitate processing within a computing environment to improve efficiency and/or performance.

Figure 7A:
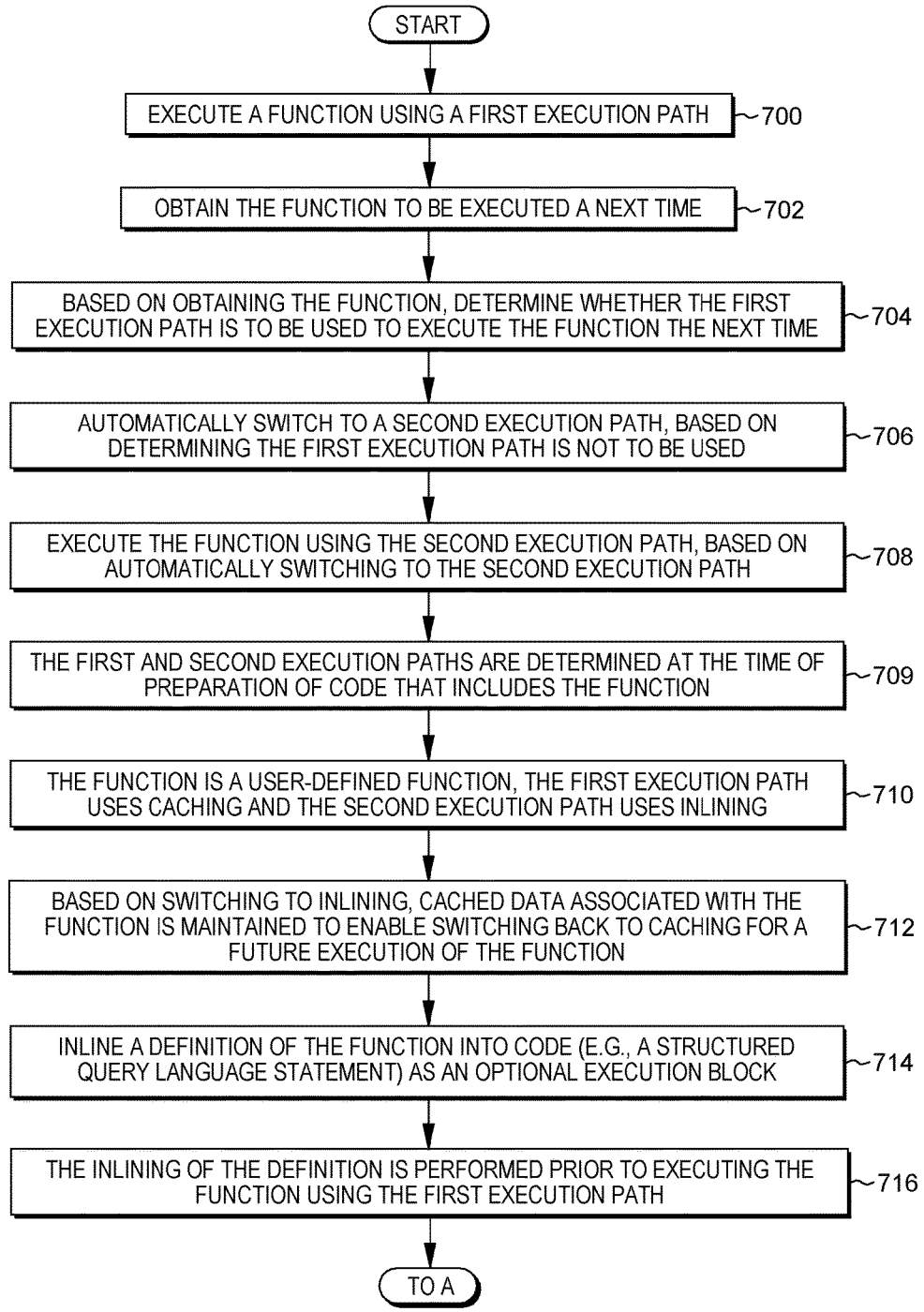
FIGS. 7A-7B depict one example of processing associated with dynamically switching between execution paths, in accordance with an aspect of the present invention.

Referring initially to FIG. 7A, a function is executed using a first execution path, STEP 700. The function is then obtained to be executed a next time, STEP 702. Based on obtaining the function, a determination is made as to whether the first execution path is to be used to execute the function the next time, INQUIRY 704. Based on determining the first execution path is not to be used, automatically switching to a second execution path, STEP 706. Based on automatically switching to the second execution path, the function is executed using the second execution path, STEP 708. The first and second execution paths are determined at the time of preparation (e.g., SQL PREPARE) of code that includes the function (e.g., SQL statement), STEP 709.

In one example, the function is a user-defined function, the first execution path uses caching and the second execution path uses inlining, STEP 710. Based on switching to inlining, in one example, cached data associated with the function is maintained to enable switching back to caching for a future execution of the function, STEP 712.

In one embodiment, a definition of the function is inlined into code (e.g., a structured query language statement) as an optional execution block, STEP 714. The inlining of the definition is performed prior to executing the function using the first execution path, STEP 716.

Figure 7B:
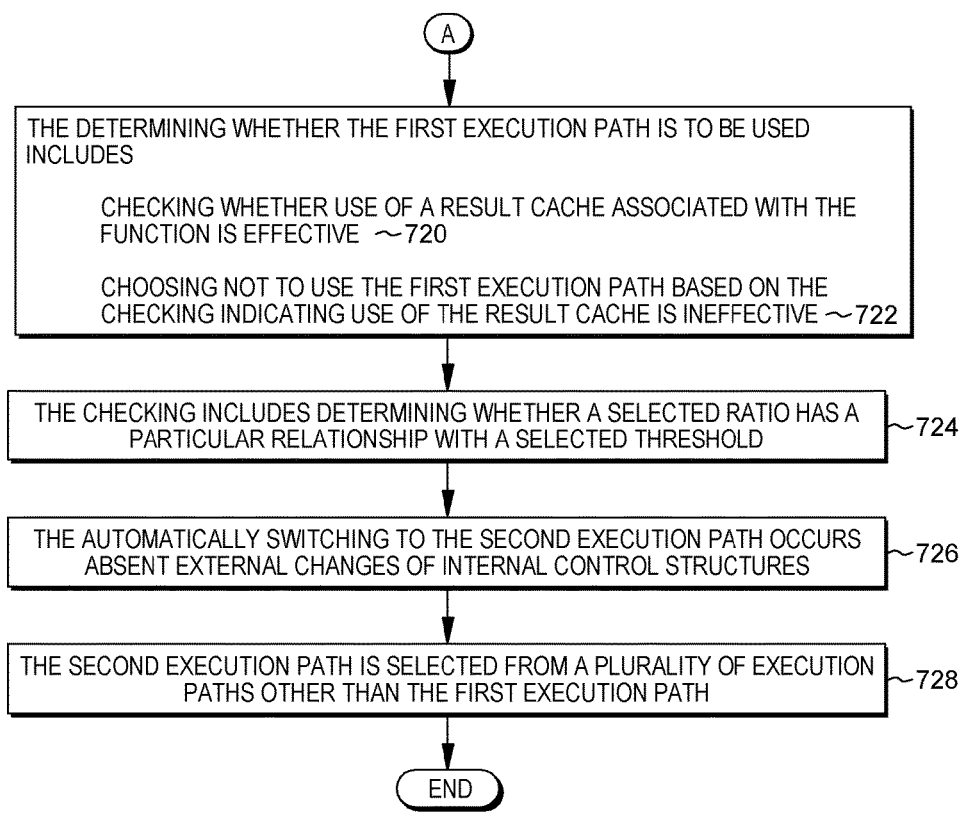

Referring to FIG. 7B, in one example, the determining whether the first execution path is to be used includes checking whether use of a result cache associated with the function is effective, STEP 720, and choosing not to use the first execution path based on the checking indicating use of the result cache is ineffective, STEP 722. The checking includes, for instance, determining whether a selected ratio has a particular relationship with a selected threshold, STEP 724.

In one embodiment, the automatically switching to the second execution path occurs absent external changes of internal control structures, STEP 726. Further, in one example, the second execution path is selected from a plurality of execution paths other than the first execution path, STEP 728.

Figure 8A:
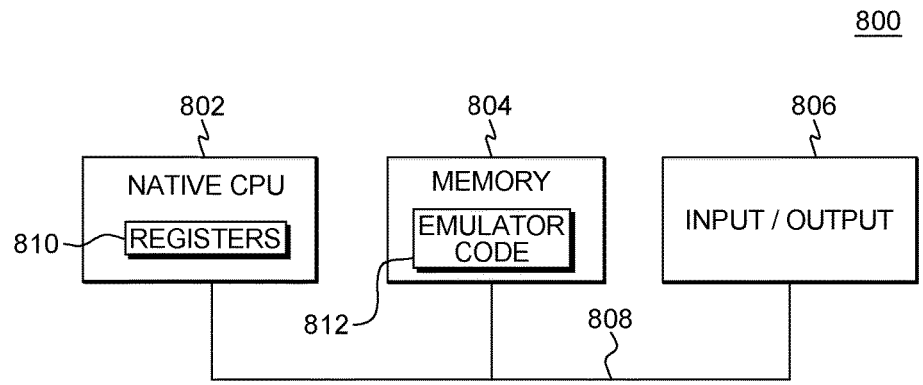
FIG. 8A depicts another example of a computing environment to incorporate and use one or more aspects of the present invention.

Another example of a computing environment to incorporate and use one or more aspects of the present invention is described with reference to FIG. 8A. In this example, a computing environment 800 includes, for instance, a native central processing unit (CPU) 802, a memory 804, and one or more input/output devices and/or interfaces 806 coupled to one another via, for example, one or more buses 808 and/or other connections. As examples, computing environment 800 may include a z Systems server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 802 includes one or more native registers 810, such as one or more general purpose registers and/or one or more special purpose registers used during processing within the environment. These registers include information that represents the state of the environment at any particular point in time.

Moreover, native central processing unit 802 executes instructions and code that are stored in memory 804. In one particular example, the central processing unit executes emulator code 812 stored in memory 804. This code enables the computing environment configured in one architecture to emulate one or more other architectures. For instance, emulator code 812 allows machines based on architectures other than the z/Architecture, such as PowerPC processors, Power Systems servers, HP Superdome servers or others, to emulate the z/Architecture and to execute software and instructions developed based on the z/Architecture.

Figure 8B:
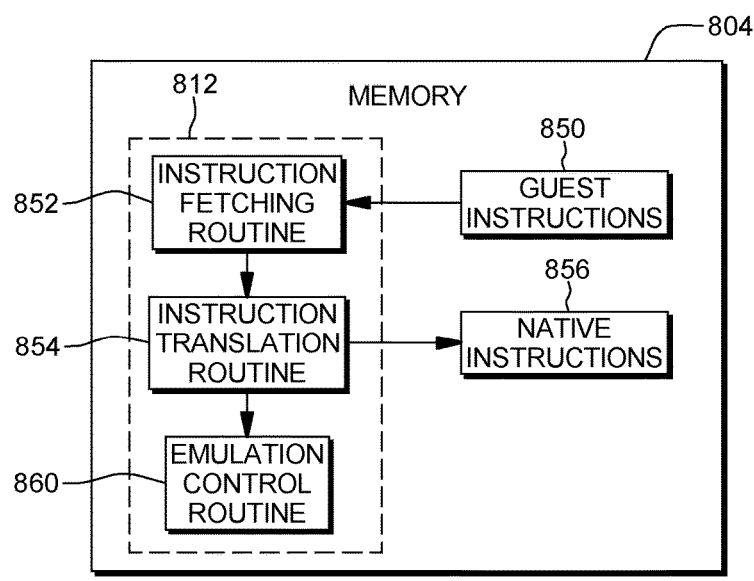
FIG. 8B depicts further details of the memory of FIG. 8A.

Further details relating to emulator code 812 are described with reference to FIG. 8B. Emulated instructions 850 stored in memory 804 comprise software instructions (e.g., correlating to machine instructions) that were developed to be executed in an architecture other than that of native CPU 802. For example, emulated instructions 850 may have been designed to execute on a z/Architecture processor, but instead, are being emulated on native CPU 802, which may be, for example, an Intel Itanium II processor. In one example, emulator code 812 includes an instruction fetching routine 852 to obtain one or more emulated instructions 850 from memory 804, and to optionally provide local buffering for the instructions obtained. It also includes an instruction translation routine 854 to determine the type of emulated instruction that has been obtained and to translate the emulated instruction into one or more corresponding native instructions 856. This translation includes, for instance, identifying the function to be performed by the emulated instruction and choosing the native instruction(s) to perform that function.

Further, emulator code 812 includes an emulation control routine 860 to cause the native instructions to be executed. Emulation control routine 860 may cause native CPU 802 to execute a routine of native instructions that emulate one or more previously obtained emulated instructions and, at the conclusion of such execution, return control to the instruction fetch routine to emulate the obtaining of the next emulated instruction or a group of emulated instructions. Execution of the native instructions 856 may include loading data into a register from memory 804; storing data back to memory from a register; or performing some type of arithmetic or logic operation, as determined by the translation routine.

Each routine is, for instance, implemented in software, which is stored in memory and executed by native central processing unit 802. In other examples, one or more of the routines or operations are implemented in firmware, hardware, software or some combination thereof. The registers of the emulated processor may be emulated using registers 810 of the native CPU or by using locations in memory 804. In embodiments, emulated instructions 850, native instructions 856 and emulator code 812 may reside in the same memory or may be disbursed among different memory devices.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
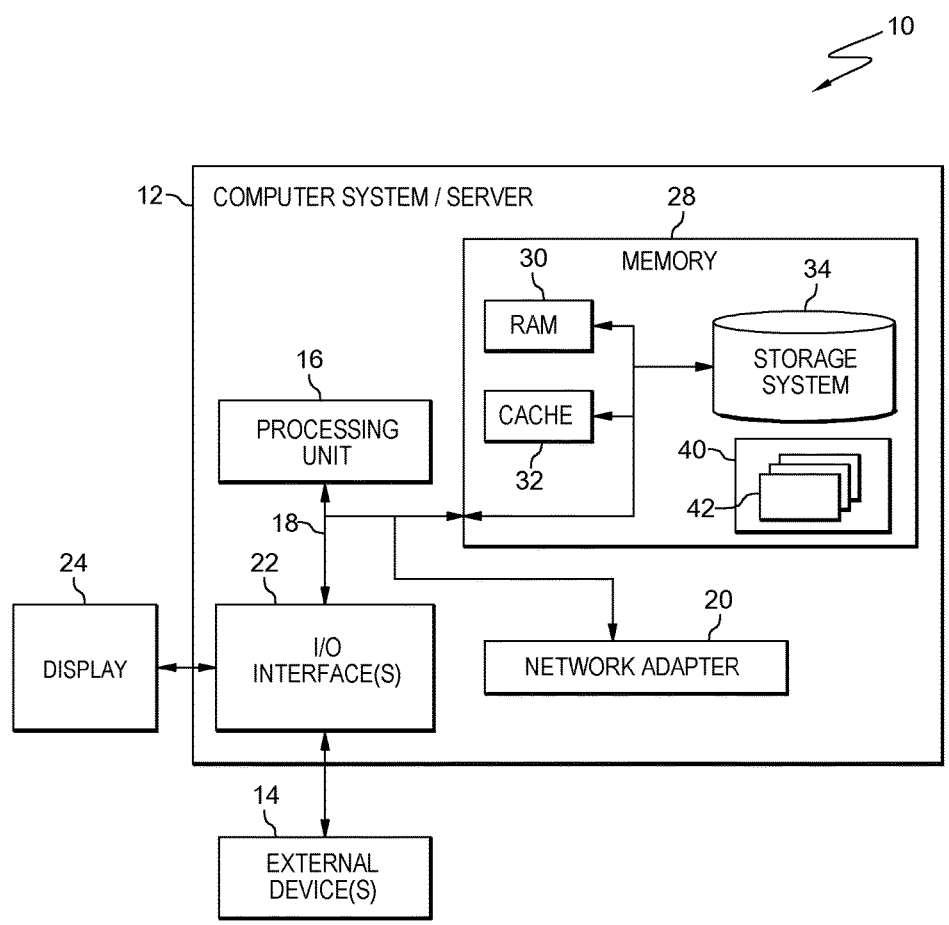
FIG. 9 depicts one embodiment of a cloud computing node.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
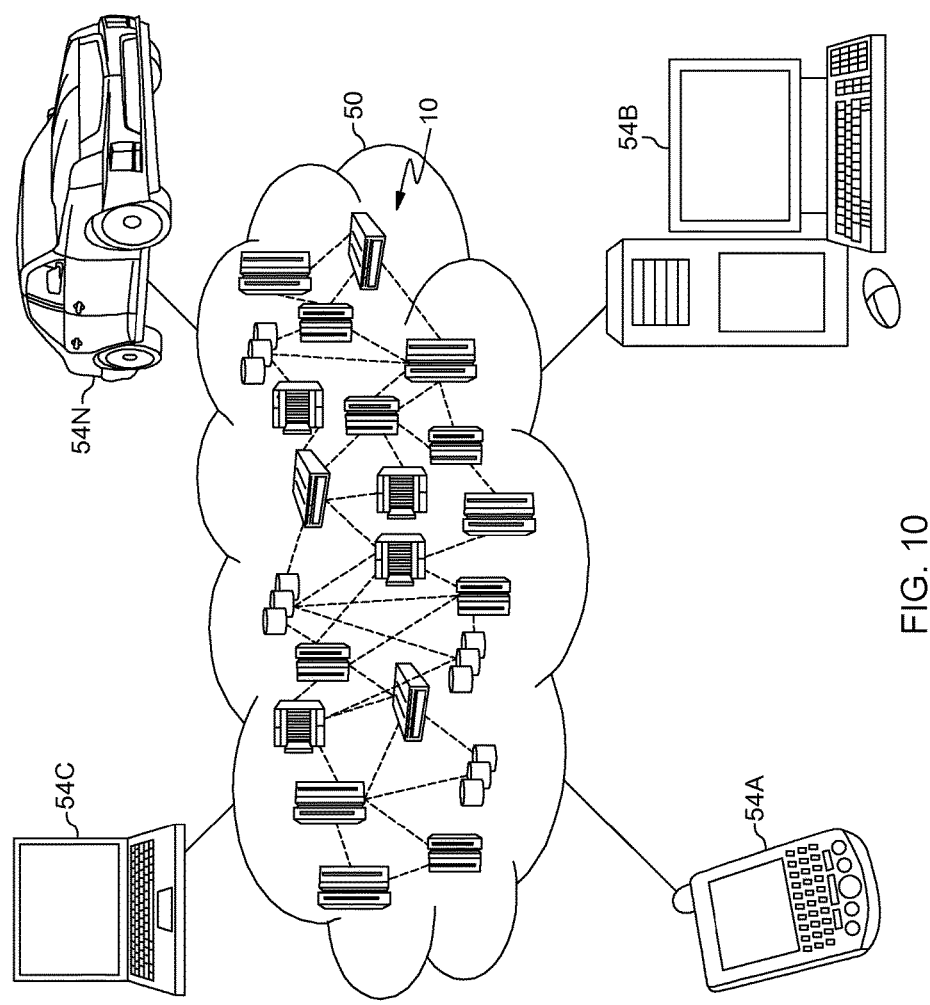
FIG. 10 depicts one embodiment of a cloud computing environment.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
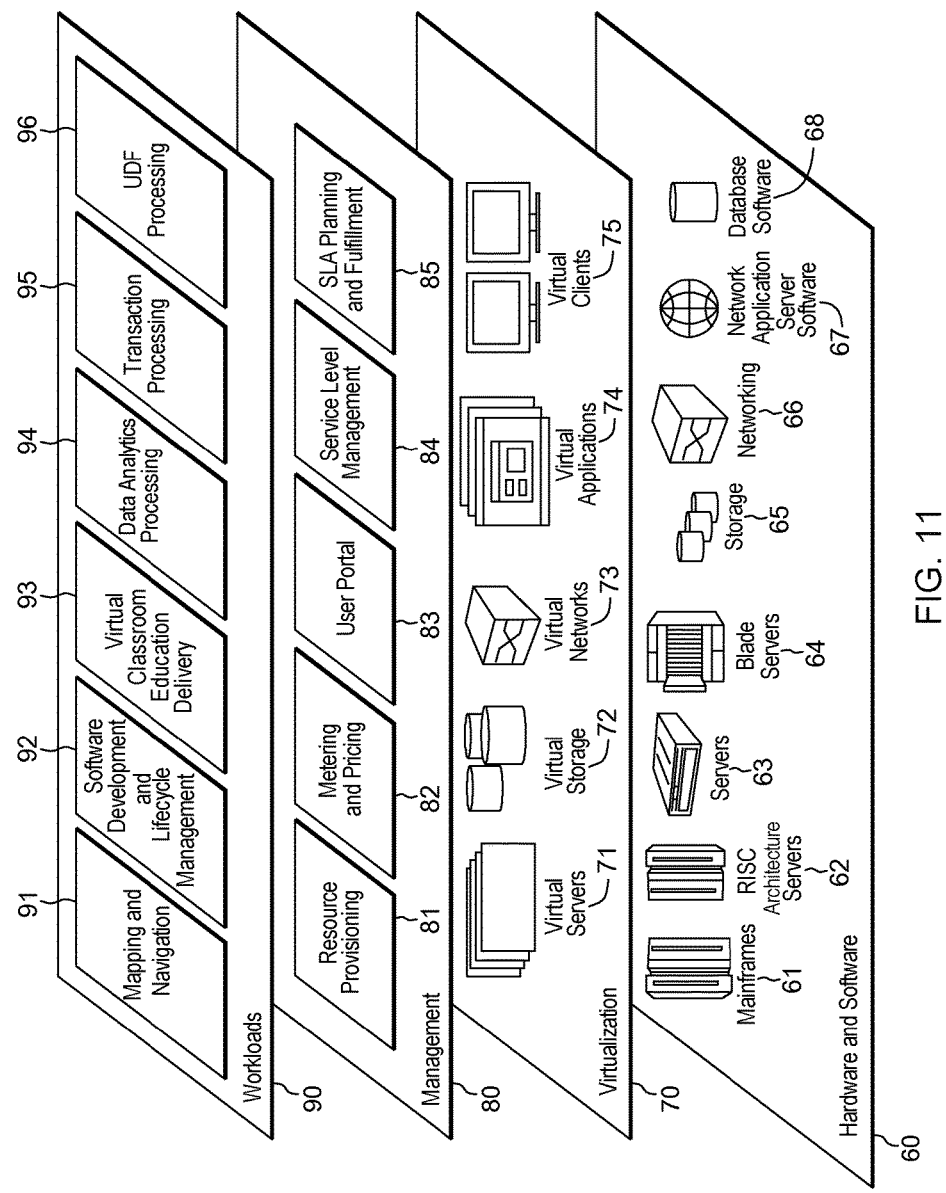
FIG. 11 depicts one example of abstraction model layers.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user-defined function processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different execution paths may be used and/or different types of code. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, said computer program product comprising:
a computer readable storage medium readable by a processing circuit and storing instructions for execution by the processing circuit for performing a method comprising:
executing a function using a first execution path;
obtaining the function to be executed a next time;
determining, based on obtaining the function, whether the first execution path is to be used to execute the function the next time, comprising:
checking whether use of a result cache associated with the function is effective; and
choosing not to use the first execution path based on the checking indicating use of the result cache is ineffective;
automatically switching to a second execution path, based on determining the first execution path is not to be used, wherein the first execution path and the second execution path are supported automatically absent external changes, and wherein the automatically switching to the second execution path occurs absent external changes of internal control structures; and executing the function using the second execution path, based on automatically switching to the second execution path, wherein the first execution path and the second execution path are determined at preparation time of code that includes the function, wherein the function is a user-defined function, the first execution path uses caching and the second execution path uses inlining.

2. The computer program product of claim 1, wherein based on switching to inlining, cached data associated with the function is maintained to enable switching back to caching for a future execution of the function.

3. The computer program product of claim 1, wherein the method further comprises inlining a definition of the function into code as an optional execution block.

4. The computer program product of claim 3, wherein the inlining of the definition is performed prior to executing the function using the first execution path.

5. The computer program product of claim 3, wherein the code comprises a structured query language statement.

6. The computer program product of claim 1, wherein the checking comprises determining whether a selected ratio has a particular relationship with a selected threshold.

7. The computer program product of claim 1, wherein the second execution path is selected from a plurality of execution paths other than the first execution path.

8. A computer system for facilitating processing within a computing environment, said computer system comprising:
 a memory; and
 a processor in communication with the memory, wherein the computer system is configured to perform a method, said method comprising:
  executing a function using a first execution path;
  obtaining the function to be executed a next time;
  determining, based on obtaining the function, whether the first execution path is to be used to execute the function the next time, comprising:
   checking whether use of a result cache associated with the function is effective; and
   choosing not to use the first execution path based on the checking indicating use of the result cache is ineffective;
  automatically switching to a second execution path, based on determining the first execution path is not to be used, wherein the first execution path and the second execution path are supported automatically absent external changes, and wherein the automatically switching to the second execution path occurs absent external changes of internal control structures; and
  executing the function using the second execution path, based on automatically switching to the second execution path, wherein the first execution path and the second execution path are determined at preparation time of code that includes the function, wherein the function is a user-defined function, the first execution path uses caching and the second execution path uses inlining.

9. The computer system of claim 8, wherein the method further comprises inlining a definition of the function into code as an optional execution block.

10. The computer system of claim 8, wherein the second execution path is selected from a plurality of execution paths other than the first execution path.

11. A computer-implemented method of facilitating processing within a computing environment, said computer-implemented comprising:
 executing, by a processor, a function using a first execution path;
 obtaining the function to be executed a next time;
 determining, based on obtaining the function, whether the first execution path is to be used to execute the function the next time, comprising:
  checking whether use of a result cache associated with the function is effective; and
  choosing not to use the first execution path based on the checking indicating use of the result cache is ineffective;
 automatically switching to a second execution path, based on determining the first execution path is not to be used, wherein the first execution path and the second execution path are supported automatically absent external changes, and wherein the automatically switching to the second execution path occurs absent external changes of internal control structures; and
 executing the function using the second execution path, based on automatically switching to the second execution path, wherein the first execution path and the second execution path are determined at preparation time of code that includes the function, wherein the function is a user-defined function, the first execution path uses caching and the second execution path uses inlining.

12. The computer-implemented method of claim 11, further comprising inlining a definition of the function into code as an optional execution block.

13. The computer-implemented method of claim 11, wherein the second execution path is selected from a plurality of execution paths other than the first execution path.

* * * * *